United States Patent [19]

Hsich et al.

[11] Patent Number: 6,155,304
[45] Date of Patent: Dec. 5, 2000

[54] REINFORCED FLEXIBLE TUBING FOR FLUID HANDLING SYSTEMS AND METHOD

[75] Inventors: Henry S. Hsich; Dennis C. Soles, both of Rochester Hills, Mich.

[73] Assignee: TI Group Automotive Systems Corp., Warren, Mich.

[21] Appl. No.: 09/326,719

[22] Filed: Jun. 7, 1999

Related U.S. Application Data

[63] Continuation-in-part of application No. 08/676,728, Jul. 8, 1996, Pat. No. 5,931,201, which is a continuation-in-part of application No. 08/593,068, Jan. 29, 1996, Pat. No. 5,934,336.

[51] Int. Cl.$^7$ ...................................................... F16L 11/04
[52] U.S. Cl. .......................... 138/137; 138/125; 138/144; 138/129
[58] Field of Search ..................................... 138/137, 140, 138/141, DIG. 1, DIG. 7, DIG. 3, 125, 129, 144

[56] References Cited

U.S. PATENT DOCUMENTS

| | | | |
|---|---|---|---|
| 884,634 | 4/1908 | Bragg | 138/123 |
| 3,070,132 | 12/1962 | Sheridan | 138/118 |
| 3,166,688 | 1/1965 | Rowand et al. | 138/103 X |
| 3,473,087 | 10/1969 | Slade | 138/103 |
| 3,907,955 | 9/1975 | Viennot | 264/105 |
| 4,384,595 | 5/1983 | Washkewicz et al. | 138/127 |
| 4,643,927 | 2/1987 | Luecke et al. | 428/36 |
| 4,706,713 | 11/1987 | Sadamitsu et al. | 138/137 |
| 4,887,647 | 12/1989 | Igarashi et al. | 138/126 |
| 4,996,264 | 2/1991 | Aonuma et al. | 525/179 |
| 5,038,833 | 8/1991 | Brunhofer | 138/137 |
| 5,076,329 | 12/1991 | Brunhofer | 138/137 |
| 5,142,782 | 9/1992 | Martucci | 138/125 |
| 5,170,011 | 12/1992 | Martucci | 138/118 X |
| 5,284,184 | 2/1994 | Noone et al. | 138/121 |
| 5,380,797 | 1/1995 | Siol et al. | 525/71 |
| 5,383,087 | 1/1995 | Noone et al. | 138/137 X |
| 5,419,374 | 5/1995 | Nawrot et al. | 138/137 |
| 5,460,771 | 10/1995 | Mitchell et al. | 264/508 |
| 5,469,892 | 11/1995 | Noone et al. | 138/121 |
| 5,524,673 | 6/1996 | Noone et al. | 138/103 |
| 5,549,948 | 8/1996 | Blong et al. | 428/36.9 |
| 5,554,425 | 9/1996 | Krause et al. | 138/118 X |
| 5,566,720 | 10/1996 | Cheney et al. | 138/137 |
| 5,613,523 | 3/1997 | Klawuhn et al. | 138/126 |
| 5,653,266 | 8/1997 | Reynolds et al. | 138/137 |

FOREIGN PATENT DOCUMENTS

| | | |
|---|---|---|
| 0551094 | 7/1993 | European Pat. Off. . |
| WO 9321466 | 10/1993 | WIPO . |
| WO 9325835 | 12/1993 | WIPO . |
| WO 9409303 | 4/1994 | WIPO . |
| WO 9523036 | 8/1995 | WIPO . |

OTHER PUBLICATIONS

"Phase Diagrams of Rubber–Modified Epoxies by Rayleigh–Brillouin Scattering and Thermodynamically Reversible and Irreversible Control on Morphology of Multiphase Systems," 34th International SAMPE Symposium 1989.

"Phase Separation Mechanism of Rubber–Modified Epoxy," Journal of Materials Science 25 1990.

"Morphology and Properties Control on Rubber–Epoxy Alloy Systems," Polymer Engineering and Science 1990.

Henry S. Hsich, "Morphology and Property Control via Phase Separation or Phase Dissolution During Cure in Multiphase Systems," 185–203, published Jan. 1991 in advances in Polymer Technology, vol. 10, No. 3.

"Thermodynamically Reversible and Irreversible Control on Morphology of Multiphase Systems," Journal of Materials Science 25, Chapman and Hall, Ltd. 1990.

*Primary Examiner*—Patrick Brinson
*Attorney, Agent, or Firm*—McEachran, Jambor, Keating, Bock & Kurtz

[57] ABSTRACT

A reinforced multi-layer flexible tubing for use in fuel-line applications. An inner layer of fluoroplastic is provided. The tubing is manufactured by simultaneously wrapping a reinforcing fabric ribbon layer and extruding a cover layer of a multiphase polymer around the inner layer.

8 Claims, No Drawings

REINFORCED FLEXIBLE TUBING FOR FLUID HANDLING SYSTEMS AND METHOD

This application is a continuation-in-part of application Ser. No. 08/676,728 filed on Jul. 8, 1996, now U.S. Pat. No. 5,931,201 which is a continuation-in-part of Ser. No. 08/593,068, filed on Jan. 29, 1996 now U.S. Pat. No. 5,934,336.

BACKGROUND OF THE INVENTION

The present invention relates to multi-layer tubing for fluid and vapor handling systems. More specifically, it relates to a low cost and high performance reinforced flexible multi-layer tubing for use in brake and fuel line systems which has high mechanical and burst strength and low permeation.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and in cold climates, there is exposure to extremely low temperatures as well.

This abundance of considerations has led to design of tubing assemblies having multiple layers. The materials of each layer have specific, and preferably complementary properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses a tubing assembly having two coextruded layers of different plastics, and a coextruded layer of adhesive therebetween. The layers are chosen from plastics having complementary properties. U.S. Pat. No. 4,643,927 to Luecke et al. discloses a tubing assembly having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows a multi-layer tubing assembly having an inner fluororubber layer that prevents degradation due to amine-type additives and also exhibits improved adhesion to an outside rubber layer U.S. Pat. No. 5,038,833 to Brunnhofer discloses a tubing assembly having a protective outer polyamide layer, a middle alcohol barrier layer of polyvinylalcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. No. 3,166,688 to Rowand et al. and U.S. Pat. No. 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Multi-layer tubing assemblies utilizing fluoropolymers tend to be rigid and inflexible, particularly at low temperatures. Fluoropolymers having strong mechanical properties typically do not bond well with other non-fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant PVDF layer, and an innermost conductive PVDF layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing assembly having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore in many cases (such as with corona treatment), only temporary bonding is achieved and delamination may occur with aging.

Another approach has been to utilize multi-layer tubing assemblies having fluoroelastomer permeation-resistant layers and non-fluoroelastomer cover layers. U.S. Pat. Nos. 4,842,024, 4,905,736, 5,093,166 and 5,346,681 are exemplary. More recently, fluoroplastics have been used as a permeation-resistant layer along with non-fluoroelastomers or polyolefin thermoplastic elastomers as a cover layer. These approaches, however, require a two-step cross-head extrusion process and may also require a vulcanization process. Such processes are expensive and slow, and the mechanical strength and cold impact resistance of the resulting tubing is poor.

Often, there is need for a reinforcement layer in the tubing as well. The art contains numerous examples of multi-layer tubings which include reinforcement layer(s). U.S. Pat. Nos. 4,196,464, 4,330,017 and 4,759,338 disclose reinforced flexible tubings which have a fiber braiding or filament winding between elastomer layers. The fiber braiding and/or filament winding processes used to make these tubings are slow and expensive. Also, use of elastomers entails a time consuming vulcanization process conducted at high temperatures which may be environmentally hazardous.

U.S. Pat. Nos. 5,142,782, 5,142,878 and 5,170,011 disclose reinforced tubings which include a fiber glass braiding layer over a layer of fluoroplastic such as PTFE (polytetrafluoroethylene). The processes involved in making these tubings are also expensive and time consuming, typically involving the multiple steps of: (1) sintering and extruding an inner PTFE tubing layer; (2) applying a braided reinforced glass fiber layer over the inner layer; (3) dispersing a PTFE resin and carrier fluid into the reinforcing layer; and (4) sintering the assembled tubing.

SUMMARY OF THE INVENTION

The present invention provides a low cost and high performance reinforced flexible multi-layer tubing made by simultaneously wrapping a fabric ribbon and extruding a cover layer of a multiphase polymer around an inner fluoroplastic layer. The resultant tubing has enhanced mechanical and burst strength and low permeation.

DETAILED DESCRIPTION OF THE PREFERRED EMBODIMENTS

A first embodiment of the present invention is a four-layer tubing assembly for use in liquid fuel-line applications. It includes an extruded innermost semi-conductive fluoroplastic layer. The fluoroplastic is made semi-conductive by mixing it with 1% to 10% by weight of conductive carbon black. Metallic conductive fillers such as silver, copper or steel may also be utilized. It has a surface resistivity in the range of about $10^1$ to $10^6$ ohm/sq., with a preferential range of $10^2$ to $10^5$ ohm/sq. Suitable fluoroplastics include ETFE (ethylene tetrafluoroethylene), THV (a terpolymer of tetrafluoroethylene, hexafluoropropylene and vinylidene fluoride), PVDF (polyvinylidene fluoride) or blends of these fluoroplastics.

An inner permeation-resistant fluoroplastic layer coextrudable at temperatures below 600 degrees Fahrenheit is coextruded with and surrounds the innermost semi-conductive layer. The importance of this layer being extrudable at temperatures below 600 degrees Fahrenheit resides in the fact that the some materials contained in the cover and/or outer layers, such as polyamides, must be extruded at temperatures below 600 degrees Fahrenheit. Temperatures above 600 degrees Fahrenheit may liquefy materials such as polyamides and make them unsuitable for extrusion. Fluoroplastics suitable for the permeation-resistant layer are the same as those fluoroplastics identified as suitable for the semi-conductive layer.

An adhesive layer is coextruded around the inner permeation-resistant layer. The adhesive is a polymer blend or alloy that has a multiphase morphology wherein one phase is compatible or miscible with the fluoroplastic utilized in the inner tubing layers, and another phase is compatible or miscible with the rubber-like multiphase polymer utilized in the cover layer. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990). Use of a polymer blends and alloys having multiphase morphology is also described in the inventor's prior art publications, H. S.-Y. Hsich, Proc. 34th Int. SAMPE Symp., 884 (1989), H. S.-Y. Hsich, J Mater. Sci., 25, 1568 (1990), H. S.-Y. Hsich, Polym. Eng. Sci., 30, 493 (1990).

A flexible rubber-like multiphase polymer cover layer is coextruded around the adhesive layer. The multiphase polymer has at least two glass transition temperatures in which their morphology and property can be manipulated by a thermodynamic process to create the desired damping characteristic. This concept of morphology control through a thermodynamic process to create the desired damping characteristic is also described in the inventor's prior art publications cited above. Suitable multiphase polymers include polymer blends or alloys of polyamides, polyesters, polyurethane and matallocene polyolefins. These polymers are rubber-like and have hardnesses in the range of Shore A 50–98 and tensile strengths in the range of 3000–6000 psi (20–40 MPa). There is no requirement of vulcanization.

A second embodiment of the present invention is a three-layer tubing assembly for use in liquid fuel-line applications. It includes an extruded inner semi-conductive and permeation-resistant fluoroplastic layer. The fluoroplastic is made semi-conductive by mixing it with 1% to 10% by weight of conductive carbon black. It has a surface resistivity in the range of about $10^2$ to $10^6$ ohm/sq., with a preferential range of $10^3$ to $10^5$ ohm/sq. The fluoroplastic can undergo extrusion at temperatures below 600 degrees Fahrenheit. Suitable fluoroplastics are the same as those fluoroplastics identified as suitable in the first embodiment.

An adhesive layer is coextruded around the inner permeation-resistant layer. The adhesive, as in the first embodiment, is a polymer blend or alloy that has a multiphase morphology wherein one phase is compatible or miscible with the utilized fluoroplastic, and another phase is compatible or miscible with the utilized rubber-like multiphase polymer. A rubber-like multiphase polymer cover layer is coextruded around the adhesive layer. Suitable multiphase polymers are the same as those identified as suitable for the first embodiment.

A third embodiment of the present invention is a three-layer tubing assembly for use in vapor fuel-line applications. It includes an extruded inner permeation-resistant fluoroplastic layer. The fluoroplastic is extrudable at temperatures below 600 degrees Fahrenheit. Suitable fluoroplastics are the same as those identified above.

An adhesive layer is coextruded around the inner permeation-resistant layer. The adhesive, as in the first and second embodiments, is a polymer blend or alloy that has a multiphase morphology wherein one phase is compatible or miscible with fluoroplastic and another phase is compatible or miscible with a rubber-like multiphase polymer.

A rubber-like multiphase polymer cover layer is coextruded around the adhesive layer. Suitable multiphase polymers are the same as those identified above.

A fourth embodiment of the present invention is a four-layer tubing assembly for use in vapor fuel-line applications. The fourth embodiment is the same as the third embodiment but includes an additional, outermost plastic layer. Suitable plastics for this outermost layer include polyamides and polyesters.

The fifth embodiment of the present invention comprises a reinforced flexible tubing including an inner layer, a reinforcing fabric ribbon layer and a cover layer. Suitable fluoroplastics for inner layer include PTFE (polytetrafluoroethylene), PFA (perfluoroalkoxy fluorocarbon resin), ETFE (ethylene tetrafluoroethylene), THV (a terpolymer of tetrafluoroethylene, hexafluoropropylene and vinylidene fluoride), PVDF (polyvinylidene fluoride) or blends of these fluoroplastics.

The cover layer may be comprised of the same material as the inner layer (plastic-like), or it may be comprised of rubber-like multiphase polymers. The rubber-like multiphase polymers for forming the outer layer have the same characteristics as those identified in the first embodiment. Suitable multiphase polymers include polymer blends/alloys or copolymers of polyamides, polyesters or matallocene polyolefins. These polymers are rubber-like and have hardness in the range of Shore A 50–98 and tensile strengths in the range of 1500–8000 psi (10–55 Mpa). There is no requirement of vulcanization.

A reinforcing fabric ribbon layer is disposed between the inner layer and cover layer. The tubing is manufactured by simultaneously wrapping the reinforcing fabric ribbon and extruding the cover layer around the inner fluoroplastic tubing layer. Expensive and time consuming prior art process steps such as braiding, dispersing binders or adhesive, sintering or vulcanization are not needed.

Various features of the present invention have been described with reference to three embodiments. It should be understood that modification may be made without departing from the spirit and scope of the invention as represented by the following claims.

What is claimed is:

1. A method of manufacturing a multi-layer reinforced flexible tubing comprising the following steps:
   (a) providing an inner layer of fluoroplastic; and
   (b) simultaneously wrapping a fabric ribbon layer and extruding a layer of multiphase polymer around said inner layer.

2. A method of manufacturing a tubing as claimed in claim 1 wherein said fluoroplastic of said inner layer is selected from a group consisting of polytetrafluoroethylene, perfluoroalkoxy fluorocarbon resin, ethylene tetrafluoroethylene, terpolymers of tetrafluoroethylene, hexafluoropropylene and vinylidene fluoride, and polyvinylidene fluoride.

3. A method of manufacturing a tubing as claimed in claim 1 wherein said multiphase polymer is selected from a group consisting of polyamide, polyesters and matallocene polyolefins.

4. A method of manufacturing a tubing as claimed in claim 1 wherein said multiphase polymer has a hardness in a range of Shore A 50–98 and a tensile strength in a range of 1500–8000 psi.

5. A tubing for fluid handling systems comprising:
   an inner layer of a fluoroplastic;
   a reinforcing layer of fabric ribbon wrapped around said inner layer; and
   a cover layer of multiphase polymer.

6. A tubing as claimed in claim 5 wherein said fluoroplastic of said inner layer is selected from a group consisting of polytetrafluoroethylene, perfluoroalkoxy fluorocarbon resin, ethylene tetrafluoroethylene, terpolymers of tetrafluoroethylene, hexafluoropropylene and vinylidene fluoride, and polyvinylidene fluoride.

7. A tubing as claimed in claim 5 wherein said multiphase polymer is comprised of a blend of polymers selected from a group consisting of polyamides, polyesters and matallocene polyolefins.

8. A tubing as claimed in claim 5 wherein said multiphase polymer has a hardness in a range of Shore A 50–98 and a tensile strength in a range of 1500–8000 psi.

* * * * *